(12) United States Patent
Koh et al.

(10) Patent No.: US 6,958,843 B2
(45) Date of Patent: Oct. 25, 2005

(54) WIDE-RANGE AND HIGH-RESOLUTION VARIABLE OPTICAL DELAY

(75) Inventors: Seungug Koh, Sunnyvale, CA (US); Sadeg M. Faris, Pleasantville, NY (US)

(73) Assignee: PetaComm, Inc., Sunnyvale, CA (US)

( * ) Notice: Subject to any disclaimer, the term of this patent is extended or adjusted under 35 U.S.C. 154(b) by 130 days.

(21) Appl. No.: 10/607,693

(22) Filed: Jun. 27, 2003

(65) Prior Publication Data

US 2004/0080705 A1   Apr. 29, 2004

Related U.S. Application Data

(60) Provisional application No. 60/391,860, filed on Jul. 27, 2002.

(51) Int. Cl.$^7$ ............................................. G02F 1/07
(52) U.S. Cl. ........................................ 359/253; 359/250
(58) Field of Search ................................. 359/250, 253, 359/279, 321; 349/193, 196; 342/374, 375

(56) References Cited

U.S. PATENT DOCUMENTS 5,978,125 A * 11/1999 Yao ............................ 359/256

* cited by examiner

*Primary Examiner*—David N. Spector
(74) *Attorney, Agent, or Firm*—Ralph J. Crispino (57) ABSTRACT

Variable optical delay (VOD) systems are provided that include optical switching techniques, and optical manifold techniques, and/or index switching techniques. In certain embodiments, liquid crystal cells are used to impart fine delay in a VOD system. Medium delay may be provided with index switching systems. Course delay may be provided with total-internal-reflection or polarization based optical manifold systems, or micro-fluidic based optical manifold systems. These fine, medium and course delays may be integrated in a single VOD system to provide a wide range and high resolution delay.

23 Claims, 11 Drawing Sheets

Figure 1: Delay-and-Weight Beamforming

Figure 2. Optical path length (OPL) and its variation

Figure 3A: Continuously Variable Optical Delay
(Prior Art)

Figure 3B: Continuously Variable Optical Delay
with folded optical paths
(Prior Art)

Figure 4: Discretely Variable Optical Delay using Optical Manifolds
(Prior Art)

Fig. 7A:
Pass-through path

Fig. 7B:
Folded path

Fig. 7C: LC polarization optical switch

Figure 8A:
Optical Manifolds with single folds

Figure 8B
Optical manifolds with multiple folds

Figure 8C
Molded optical manifolds

Figure 8D: Micro-Fluidic Variable Optical Delays

Figure 8E: Micro-Fluidic Optical Manifolds

Figure 9: VOD with Coarse and Fine Delays

Figure 10: All-Micro-Fluidic Variable Optical Delays

Figure 11A: Optically Isolated VOA and 1x2 Optical Switch- Forward Propagation

Figure 11B: Optically Isolated VOA and 1x2 Optical Switch- Backward Propagation

Figure 12: Massively-Parallel Analog
Optical Processing Module Using Arrayed VOD

WIDE-RANGE AND HIGH-RESOLUTION VARIABLE OPTICAL DELAY

RELATED APPLICATIONS

The present application claims priority to U.S. Provisional Application Ser. No. 60/391,860 filed on Jun. 27, 2002, which is incorporated by reference herein in its entirety.

BACKGROUND OF THE INVENTION

In array antenna systems, the signals from various antenna elements need to be combined together to form a main beam. The beamformer includes signal processing hardware capable of changing the main beam to enhance the radar or ultrasonic images. Through the beamformer, it is possible to apply different weights and delays to the signals from each of the different antenna elements. As a result, the main beam can be made to point in a specific direction, and the undesirable side lobes can be eliminated. The signals can be weighted by multiplication of a signal with a corresponding weight. The signal delays are introduced by true-time-delay (TTD) lines, which can provide a varying amount of signal propagation lengths. Then the weighted and delayed signals from the beamformer are added together to form the beam for the array antennas.

There exist a variety of beamforming techniques available for radar or ultrasonic imaging applications. Some of the well-known beamforming techniques are conventional equal-weight beamformer, null-steering beamformer, optimal beamformer, space processing beamformer, broadband beamformer, and so on. For the broadband beamformer, the TTD lines are delaying the signals from array antenna elements, while the real value signal weights are introduced to the individual signal. Thus it can provide a true space-time processing capability. In a dynamic beamforming environment, the delays and weights are updated continuously and it results in a tremendous amount of beamforming computations.

Figure 1:
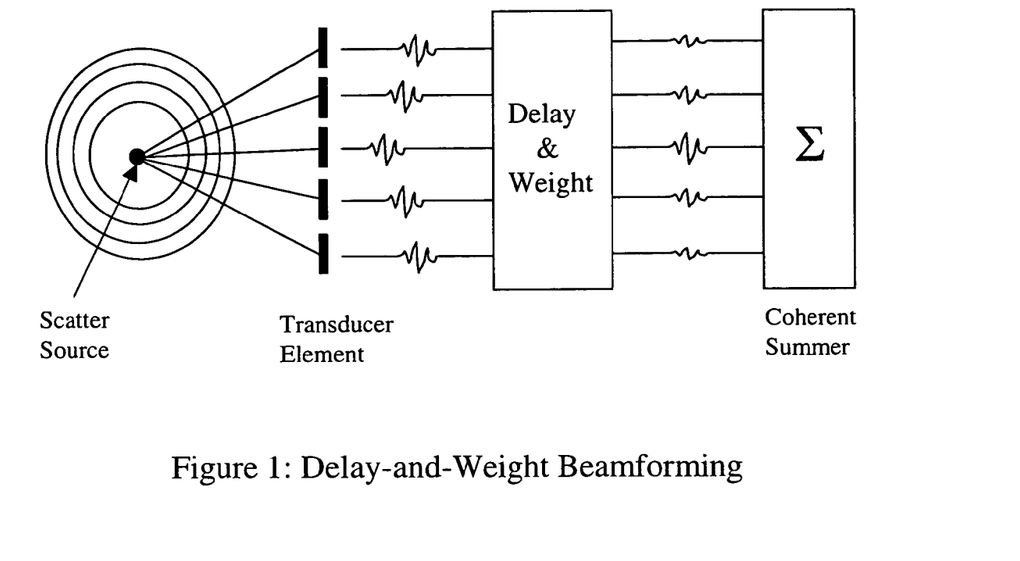
FIG. 1 shows a beamforming system using delays and weights.
Figure 2:
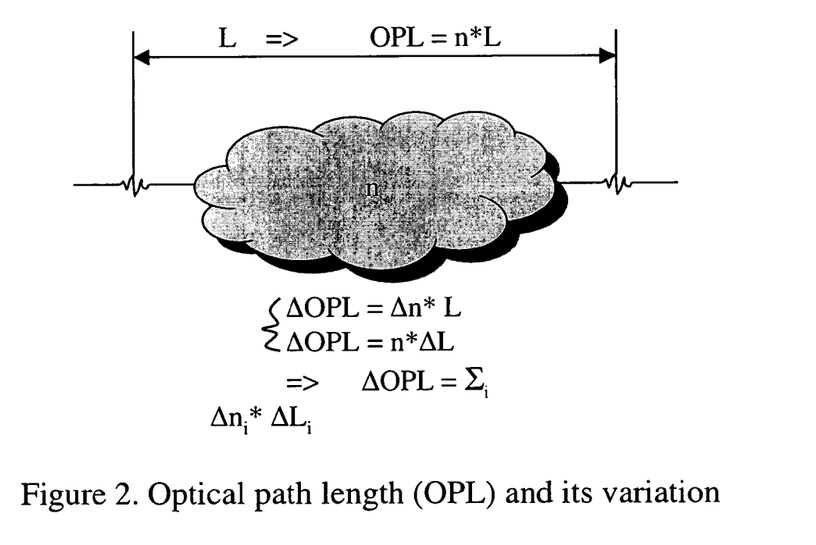
FIG. 2 illustrates optical path length (OPL) and its variation.

A simple beamforming example using delays and weights is illustrated in FIG. 1. In FIG. 1, an imaging system based on pulse-echo principle is composed of scatter source, transducer element, delay and weight unit, and coherent summer. For a coherent summation of echo signals of different transducers, the received signals have to be delayed individually according to the distance from the scatter source and the amount of signal focusing being involved. The intensity of received echo signals can vary according to the incident angle between scatter and transducer elements. In order to account this, an aperture apodization is required by applying corresponding weights to different received signals. In dynamic receive beamforming, the depth of the receive focus point has to be updated continuously with requires a continuous update of the individual amount of delay and weight applied to the signals of each element.

Photonic devices, electronic processing system, or any combination thereof can perform the dynamic beamforming computations for ultra wideband array antennas. However, it is known to be very difficult to fabricate low-cost and low-loss electronic delay lines for multi-octave true-time-delay (TTD) with bandwidth greater than 5 GHz. In order to overcome this limitation, there have been extensive research efforts on low-loss, high-bandwidth, and low-cost TTD lines, which can achieve large delay range and high delay resolution simultaneously. The TTD lines are also required to be compact, reliable, scalable to a large array, bi-directional, and rapidly programmable.

For broadband beamforming applications, analog optical signal processing hardware is incrementally favored over the electronic counter part in order to provide improved radar performance and reduced system cost. Some of the known advantages of analog optical signal processing for array antenna beamformers are: 1) broadband beamforming capability, 2) low-loss delay lines by using optical fibers, 3) no electromagnetic interference, 4) separation of beamforming and antenna over large distance, and 5) single-fiber WDM link to replace multiple bundles of transmission lines. However the disadvantageous aspects of photonic processing include: 1) bulky and expensive optical components, 2) tight alignment and packaging requirements for optical hardware, and 3) inefficient RF-to-optical (and vice versa) interfaces.

Optical beams from one or more optical fibers, predominantly single-mode optical fibers, are collimated by using fiber collimators and then coupled into one or more optical fibers using other fiber collimators. A variety of other optical elements, such as optical switch, optical manifolds, polarization beam splitter, and so on, can be placed between these fiber collimator pairs.

A variable optical delay (VOD) is a programmable device that can vary the amount of optical signal delay by changing optical path lengths. Optical path length is the product of optical signal travel length and refractive index of the medium through which the lights travel. In a memory-less system, the optical signals reaches the destination target with a time delay determined by the optical path length. If we vary the optical path length, the time delay for optical signal transmission can be altered accordingly. Shorter optical path length decreases the time delay, while longer optical path length increases it. The optical path length can be varied by altering the signal travel length: L; or by changing the refractive index of the medium: n. Therefore, if $OPL=n*L$, where n is refractive index and L is signal travel length, then $\Delta OPL=\Delta n * L$ or $\Delta OPL=n*\Delta L$. Since conventional approaches are more readily implemented without changing the refractive index of the medium, conventional VODs are implemented by either shortening or elongating the distance between signal source and target destination.

VOD can be formed in many various configurations using many different technologies. VOD can provide programmable delays in either continuous or discrete steps. For the continuous VOD, the true-time-delay is controlled by the relative movement between signal source and receive target. Either signal source or receive target is attached to the mechanical moving stage in order to provide the necessary displacement.

Figure 3A:
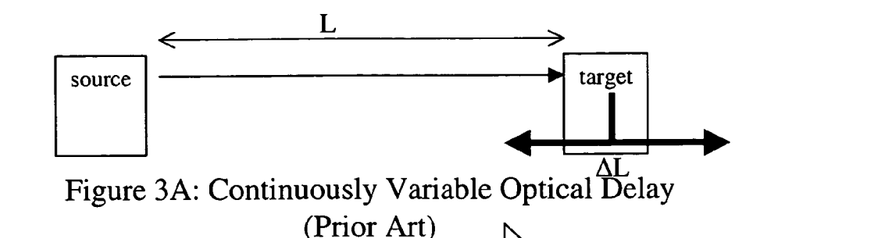
FIG. 3A shows a conventional continuously variable optical delay.
Figure 3B:
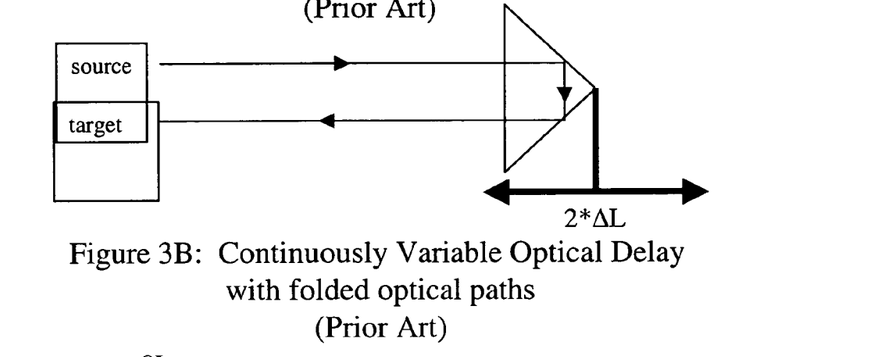
FIG. 3B shows a conventional continuously variable optical delay with folded optical paths.

FIGS. 3A and 3B depict two different conventional configurations of continuously variable delays. FIG. 3A shows a continuously variable delay using a straight optical path or a folded optical path. The relative movement between source and target triggers either true-time-delay or true-time-advance of optical signals. For the case of continuously variable optical delays with folded optical paths as shown in FIG. 3B, the number of folds being employed multiplies the amount of delay or advance available. On the other hand, the optical delay resolution for the number of folds degrades the folded optical paths. The mechanical actuators providing movements between source and target ultimately determines the VOD's performances such as speed, reliability, and delay range and resolution. The continuously variable optical delay is simple in principle and design, however commercial applications are typically bulky, heavy, slow, unreliable, and very sensitive to alignment.

Figure 4:
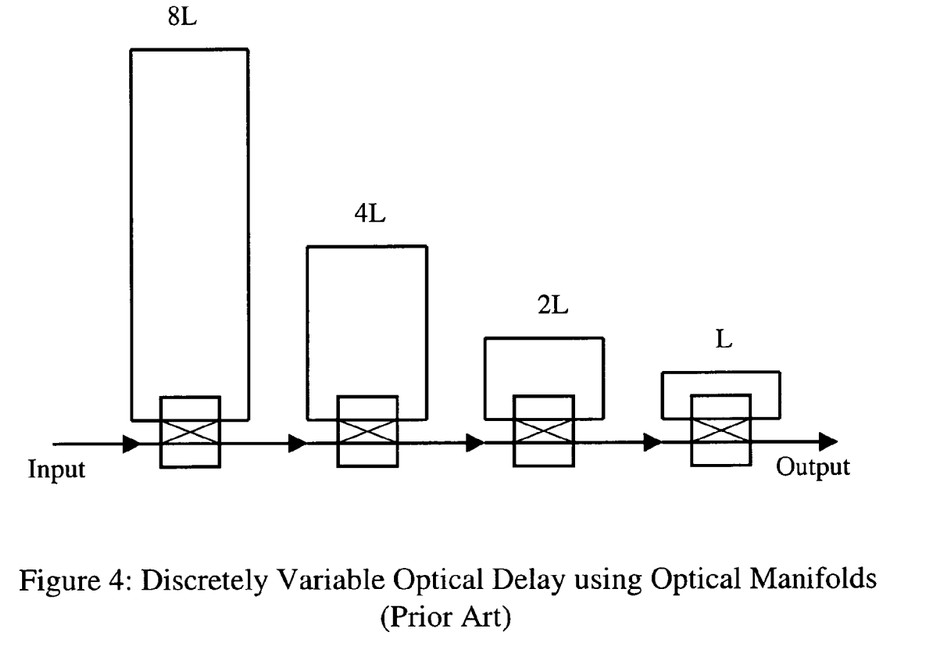
FIG. 4 illustrates a conventional discretely variable optical delay using optical manifolds.

FIG. 4 shows a discretely variable optical delay constructed by serially interconnecting optical switches and optical manifolds. The length of optical manifolds are incremented or decremented by 2n, where n is the stage number of serial interconnected pairs of optical switch and optical manifold. The total length of the optical manifold is incremented or decremented by 2n, where n is the stage number of serial interconnected pairs of optical switch and optical manifold. The total length of optical manifold determines the delay range of the discretely variable optical delay, while the shortest optical manifolds available determine the delay resolution. Two major optical components for discretely variable optical delays are add/drop optical switch (2×2 optical switch) and optical manifold. FIG. 4 illustrates a 4-bit discretely variable optical delay with four serially interconnected stages of 2×2 optical switch and optical manifold.

Optical fibers with controlled lengths and discrete add/drop optical switches implement one form of conventional VODs. It has the advantage of providing extremely long delays by using low-loss optical fiber. But such VODs require many discrete optical components to yield large footprint size, poor reliability, and high cost. The use of discrete optical components also restricts the minimum achievable optical path lengths and the VOD delay resolution. The add/drop optical switch is typically a commercially available 2×2 optical switches such as macro-mechanical optical switch, thermo-optical switches, magneto-optic switches, micro-electro-mechanical systems (MEMS), optical switches.

Other forms of conventional VOD utilizes fully integrated add/drop optical switches on the integrated optical waveguide circuits. The integrated optical waveguide circuit can monolithically combine optical switches and optical manifolds on a single substrate. However, the finite substrate size limits the number of optical switches and the length of optical manifolds. The VODs based on integrated optical waveguide circuit cannot deliver large delay range not fine delay resolution.

Conventional continuously variable optical delays are simple in principle and design, while providing a true-time-delay. However, conventional continuously variable optical delays present disadvantages such as slow speed, poor reliability, and tight alignment tolerance.

Conventional variable optical delay (VOD) for ultra wideband array antenna applications require a very large delay range and fine delay resolution simultaneously. But the conventional VOD utilizing optical fibers, add/drop optical switches, or integrated optical circuits presents serious constraints in achieving a large delay range and fine delay resolution. Due to discrete optical components and limited substrate area available for integrated optical circuits, the conventional VOD become expensive, bulky, and unreliable. The conventional VOD is not scalable to a large array and it is difficult to integrate with other analog optical signal processing hardware.

High-performance and low-cost variable optical delay (VOD) with a wide delay range and high delay resolution is essential for ultra wideband array antenna transmit/receive applications. As the analog photonic hardware, such as VOD, can significantly reduce the number of beamforming computations for the array antennas, new types of VODs are actively sought after in order to deliver compactness, high device density, reliability, low loss, bi-directional operation, high speed, wide delay range, and high delay resolution.

Therefore, VODs having smaller size, higher device density, greater reliability, less loss, high speed, high delay resolution, wide delay range, or combinations of these features as compared to conventional VODs are highly desirable.

SUMMARY OF THE INVENTION

The above-discussed and other problems and deficiencies of the prior art are overcome or alleviated by the several methods and apparatus of the present invention for Variable Optical Delays (VODs).

Herein provided is a novel VOD that is uniquely suited to improve the conventional VOD for the ultra wideband array antenna applications. The programmable VOD, based on innovative total internal reflection (TIR) or polarization optical switching, can improve both optical delay range and optical delay resolution significantly. A variety of programmable optical delays are described using polarization management and optical switching technology. Disclosed combinations of optical switching and optical manifold techniques provide an effective, reliable, low-cost enhancement of VOD for beamformer applications.

A high-performance VOD can be mass-manufactured at low cost and in large volume based on integrated optical manifolds and TIR/polarization optical switching techniques. One of the major advantages of the herein described VOD is the unique device structure to allow wider delay range and higher delay resolution over the competing VOD technologies, capable of delivering delay range greater than 10 ns and delay resolution less than 1 ps. The other advantage is a low-cost, reliable, massively parallel, and mass-manufacturable VOD array by utilizing mature and commercially proven liquid crystal and polarization optics technologies.

In further embodiments, multifunctional optical modules are described capable of delivering additional analog optical processing functionalities such as variable optical attenuation, optical shutter, optical isolation, and/or polarization dependent loss (PDL)/polarization mode dispersion (PMD) control.

The herein described VOD may perform under various environmental conditions.

In a further embodiment, a VOD is provided that is compact, reliable and low cost as compared to conventional VODs, and massively parallel to become ideally applicable to large-scale and ultra wideband array antennas. Another optional feature includes a programmable weight added to the delayed optical signal.

The present invention provides:

Variable optical delay using TIR or Polarization optical switching

High performance variable optical delay with wide delay ranges and high delay resolutions Compact and fully integrated optical manifolds High density, low cost, and low power consumption variable optical delay Micro-fluidic actuator for TIR optical switching and optical index switching Multifunctional optical modules with additional optical processing functionalities such as optical isolation, variable optical attenuation, and optical shutter In array antenna systems, the signals from various antenna elements need to be combined together to form a main beam. The beamformer is a signal processing hardware capable of changing the main beam to enhance the radar or ultrasonic images. Through the beamformer, it is possible to apply different weights and delays to the signals from each of the different antenna elements.

For broadband beamforming applications, the analog optical signal processing hardware is incrementally favored over the electronic counter part in order to provide improved radar performance and reduced system cost. Some of the known advantages of analog optical signal processing for array antenna beamformers are: 1) broadband beamforming capability, 2) low-loss delay lines by using optical fibers, 3) no electromagnetic interference, 4) separation of beamforming and antenna over large distance, and 5) single-fiber WDM link to replace multiple bundles of transmission lines. However the disadvantageous aspects of photonic processing include: 1) bulky and expensive optical components, 2) tight alignment and packaging requirements for optical hardware, and 3) inefficient RF-to-optical (and vice versa) interfaces.

Variable optical delay (VOD) is a programmable device that can vary the amount of optical signal delay by changing optical path lengths. Optical path length is the product of optical signal travel length and refractive index of the medium, where the lights travel. In a memory-less system, the optical signals reaches the destination target with a time delay determined by the optical path length. If optical path length is varied, the time delay for optical signal transmission is accordingly altered. Shorter optical path length decreases the time delay, while longer optical path length increases it. The optical path length (OPL) can be varied by altering the signal travel length: L; or by changing the refractive index of the medium: n. Therefore, if OPL=n*L, where n is refractive index and L is signal travel length, then $\Delta OPL=\Delta n^* L$ or $\Delta OPL=n^*\Delta L$. Since it is simpler to vary signal travel length than to change refractive index, the variable optical delay (VOD) may be implemented by either shortening or elongating the distance between signal source and target destination.

In one embodiment, the present VOD utilizes liquid crystal optical switches for fine delays (e.g., in the range of about 1 femto-second (fs) to about 100 fs).

In another embodiment, the present VOD utilizes regions capable of having at least 2 different fluids exchanged therein, such as air and a refractive fluid, such that as an optical signal passes therethrough, the delay is varied by the selected fluid within the region (the region dimensions being essentially constant). Such a VOD is capable of medium delays (e.g., 100 fs to 10 picoseconds (ps)).

In a further embodiment, the present VOD utilizes optical manifolds comprising polarization optical switches, liquid crystal optical switches or TIR elements arranged in a folded path to allow pass-through or delay, the delay being based on the folded path length. Alternatively, the folded path may be extended by serial liquid crystal optical switches or TIR elements. Such a VOD is capable of coarse delays (e.g., 10 ps to 1 nanosecond (ns)).

In still a further embodiment, the present VOD utilizes optical manifolds comprising regions capable of having at least 2 different fluids exchanged therein, such as air and a refractive fluid, wherein the regions are arranged in a folded path to allow pass-through or delay (depending on the choice of fluid in the region), the delay being based on the folded path length. Alternatively, the folded path may be extended by serial regions capable of having at least 2 different fluids exchanged therein. Such a VOD is capable of coarse delays (e.g., 10 ps to 1 ns).

In further embodiments, the present VOD utilizes combinations of the above-mentioned innovative optical manifolds and/or optical switching mechanisms. This allows for compact, reliable, and low-cost VOD in a large array configuration, which can deliver wide delay range and high delay resolution simultaneously.

The VOD includes optical true-time-delay line with a controllable delay range and delay resolution. Based on the integrated optical manifolds and TIR/polarization optical switching techniques, a high-performance variable optical delay (VOD) with a programmable weight can be mass-manufactured at low cost in a massively parallel array configuration. With the inclusion optional features and components described herein, a multifunctional VOD is provided that can deliver additional analog optical signal processing functionalities such as optical isolation, optical shutter, and PDL/PMD control.

A major advantage of one approach of the present invention is the unique device structure allowing wider delay range and higher delay resolution as compared to the conventional VOD technologies. For example, the herein VOD can readily deliver a delay range of 10 ns with a delay resolution less than 1 ps. The other advantage is a low-cost, reliable, massively parallel, and mass-manufacturable VOD array by utilizing mature and commercially proven liquid crystal and polarization optics technologies. Another advantage of the approach of the present invention is the ability to add and integrate a variety of analog optical processing capabilities such as variable optical attenuation, optical shutter, optical isolation, and PDL/PMD control.

DETAILED DESCRIPTION OF THE INVENTION

Herein disclosed are novel and innovative systems for implementing an optical true-time-delay line with a wide delay range and a fine delay resolution. Based on the integrated optical manifolds and TIR/polarization optical switching techniques, a high-performance variable optical delay (VOD) with a programmable weight can be mass-manufactured at low cost in a massively parallel array configuration. With the integration of additional components, a multifunctional VOD can deliver additional analog optical signal processing functionalities such as optical isolation, optical shutter, and PDL/PMD control.

One of the major advantages of embodiments of the herein described VOD is the unique device structure to allow wider delay range and higher delay resolution over the competing VOD technologies, capable of delivering delay range greater than 10 ns and delay resolution less than 1 ps. Another advantage is a low-cost, reliable, massively parallel, and mass-manufacturable VOD array by utilizing mature and commercially proven liquid crystal and polarization optics technologies. Another advantage is the ability to add and integrate a variety of analog optical processing capabilities such as variable optical attenuation, optical shutter, optical isolation, and PDL/PMD control.

Liquid Crystal Variable Optical Delay

Figures 5, 5A, 5B, 5C:
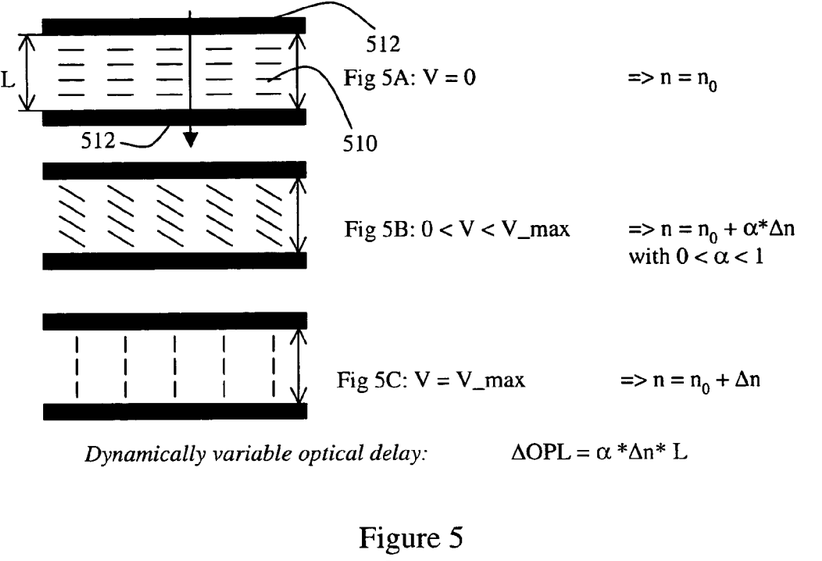
FIG. 5 shows fine control of optical delay according to the present invention using liquid crystal cell.

A VOD with a fine delay (e.g., in the range of about 1 femto-second (fs) to about 100 fs) is implemented by a liquid crystal cell as shown in FIGS. 5A–5C. In FIG. 5A, the directors 510 of liquid crystal are aligned parallel to the ITO-coated glass substrates 512 by not applying any electrical potential. The electrical potential applied between top and bottom glass substrates rotates the orientation of liquid crystal directors as shown in FIGS. 5B and 5C to result in refractive index changes. The optical path length across the liquid crystal cell is the product of liquid crystal cell gap: L; and liquid crystal refractive index: n. Therefore, varying electrical potentials can change the optical path length across the liquid crystal cell continuously. Note that the range of VOD is determined by liquid crystal cell gap: L, liquid crystal birefringence: $\Delta n$, and electrical potential: V. The VOD resolution is decided by the precise control of applied electrical potentials as well as the linearity between electrical potential and liquid crystal index change.

The liquid crystal material may comprise any liquid crystal material that can introduce electrically controlled birefringence.

Index Switching

In another embodiment, the present VOD utilizes index switching, wherein one or more regions capable of having at least 2 different fluids exchanged therein are provided. The at least 2 different fluids may comprise air and a refractive fluid. As an optical signal passes through the index switching region, the delay is varied by the selected fluid within the region (the region dimensions being essentially constant). Such a VOD is capable of medium delays (e.g., 100 fs to 10 picoseconds (ps)).

Figure 6:
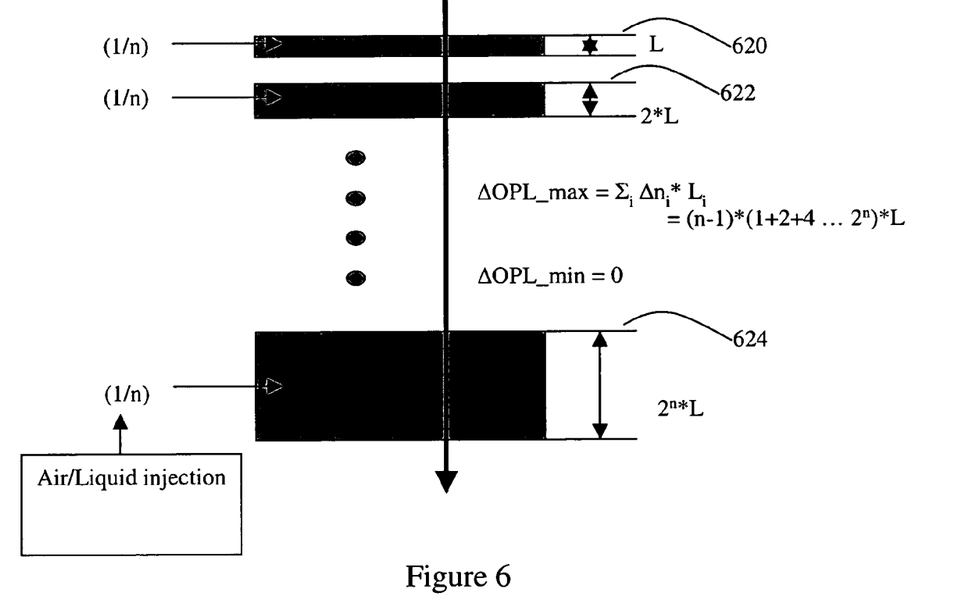
FIG. 6 shows variable optical delay according to the present invention with index switching.

As discussed above, the optical path length can be varied by altering the signal travel length: L or by changing the refractive index of the medium: n. As shown in FIG. 6, the optical index switching system employs the change of refractive index by introducing or evacuating either air or liquid material along the optical signal travel path. Although multiple regions 620, 622, 624 are depicted in FIG. 6, it is understood that a single index switch may be employed where the delay range provided by a single index switch is sufficient.

The introduction and/or evacuating into the predefined gaps may be accomplished by micro-pumps, or micro-fluidic actuators. The optical path length is determined by refractive index of liquid, number of predefined gaps, size of predefined gap, and presence of air/liquid in the gaps.

The micro-fluidic actuators may comprise electro-static actuator, electro-magnetic actuator, electro-thermal actuator, or any other MEMS actuators.

The refractive fluids may comprise any chemically stable liquid compounds. It should be capable of providing a large value for refractive index and insensitive to the environmental changes, such as temperature, humidity, pressure, aging and so on.

Optical Manifolds

In further embodiments, the present VOD utilizes optical manifolds comprising polarization optical switches, liquid crystal optical switches or TIR elements arranged in a folded path to allow pass-through or delay, the delay being based on the folded path length. Alternatively, the folded path may be extended by serial liquid crystal optical switches or TIR elements. Such a VOD is capable of coarse delays (e.g., 10 ps to 1 ns)

In still further embodiments, the present VOD utilizes optical manifolds comprising index switching, wherein regions capable of having at least 2 different fluids exchanged therein, such as air and a refractive fluid, are arranged in a folded path to allow pass-through or delay (depending on the choice of fluid in the region), the delay being based on the folded path length. Alternatively, the folded path may be extended by serial regions capable of having at least 2 different fluids exchanged therein. Such a VOD is capable of coarse delays (e.g., 10 ps to 1 ns)

Figure 7A:
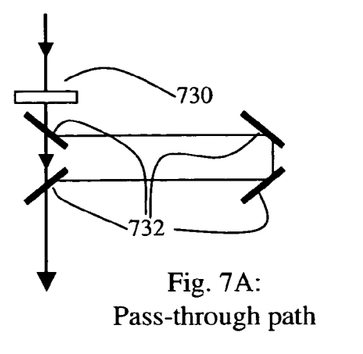
FIGS. 7A–C show variable optical delay according to the present invention using LC polarization optical switches.
Figure 7B:
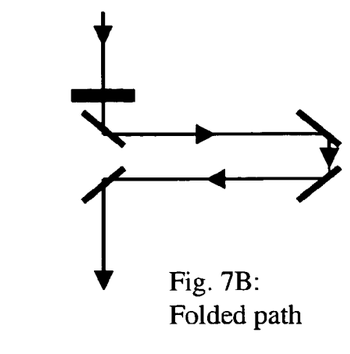
Figure 7C:
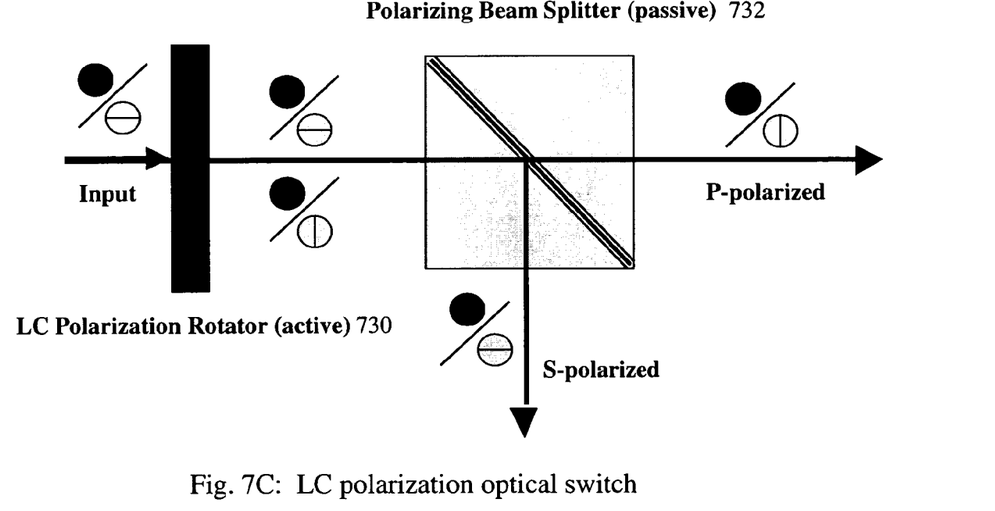

As shown in FIGS. 7A–7C, the optical space switch is capable of selecting either a pass-through path or a folded path, depending on the amount of desired delay. FIG. 7A shows the pass-through path of VOD, while the folded path is shown in FIG. 7B. The optical space switching can be realized by polarization switching based on liquid crystal as shown in FIG. 7C, utilizing an active (electronically switchable) liquid crystal (LC) polarization rotator 730 and a passive polarizing beam splitter or reflector 732. As shown in FIG. 7B, in a folded path, four passive polarization beam splitters or reflectors 732 are utilized to direct the optical signal in a folded path. Alternatively, or in combination, total internal reflection (TIR)-based optical switches can implement the optical space switching.

The polarizing beam splitters may include conventional MacNiell-type polarizing reflectors, cholesteric liquid crystal layer(s), or inorganic reflecting polarizers. These devices operate in a known manner to selectively reflect light having one polarization state (e.g. S or P1) and transmit light having the orthogonal polarization state (P or P2).

The active polarization rotator may be constructed of any type of electrically controllable birefringent material generally in the form of a half-wave retarder. The active polarization rotator may also be a liquid crystal cell, for example having a 90° twisted (or a 270° super-twisted) nematic liquid crystal, homogeneously aligned nematic liquid crystal or ferroelectric liquid crystal. For example, when no electric field is applied to either of the above devices an unpolarized beam passes through unaffected. When a predetermined electric potential is applied to the active polarization rotator, an unpolarized beam is split into polarization states S and P (or P1 and P2).

Figure 8A:
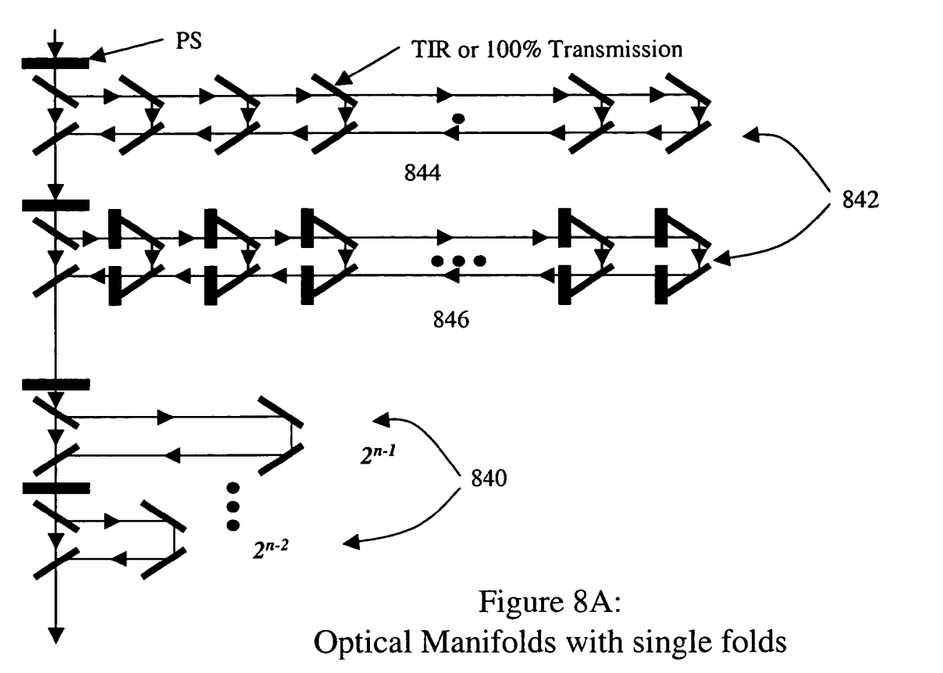
FIG. 8A shows optical manifolds according to the present invention with single folds.
Figure 8B:
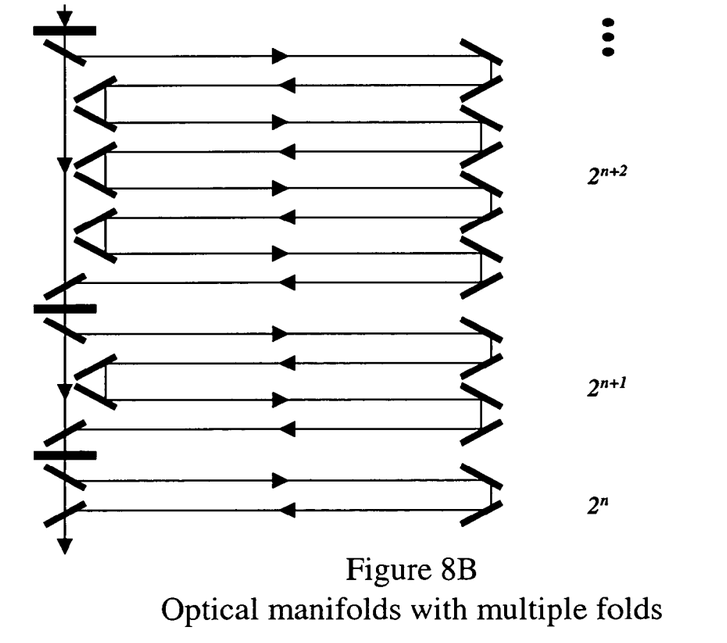
FIG. 8B shows optical manifolds according to the present invention with multiple folds.
Figure 8C:
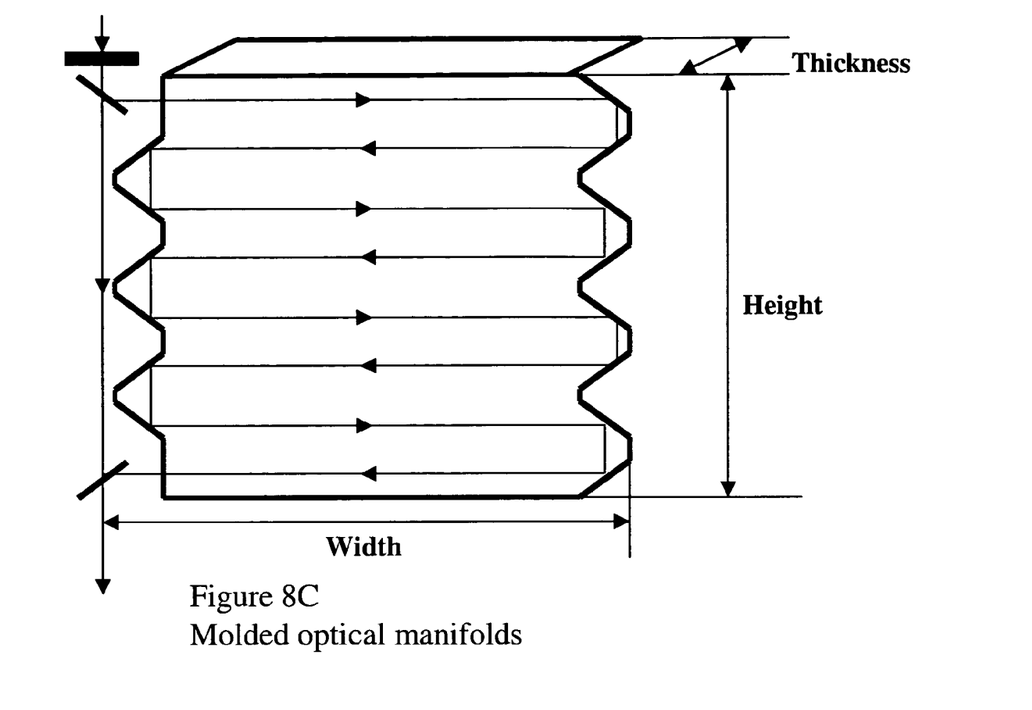
FIG. 8C shows molded optical manifolds according to the present invention.

FIGS. 8A–8C illustrate various structures of optical manifolds for VOD based on polarizing beam splitters or TIR switches. In FIG. 8A, optical manifolds with single folds are shown in both static configurations 840 and dynamic configurations 842. The dynamic optical manifolds can vary the length of optical manifold by using the distributed optical space switches along it. The distributed optical space switch could be either a TIR optical switch 844 or a polarization optical switch 846. The dynamic optical manifold allows a more flexible VOD. The static optical manifold does not vary the length of optical manifold and it needs just one optical space switch.

FIG. 8B illustrates an optical manifold with multiple folds, which can increase the available optical path lengths within a small space. The multiple folds can be implemented by stacking single folds on top of each other. The multiple folds can also be implemented in a single block of molded manifold as shown in FIG. 8C. The molded manifold will reduce the number of discrete optical components significantly. All of optical manifolds can utilize a variety of forms of optical reflection mechanisms, i.e. total internal reflector, metallic reflector, or polarization beam splitter reflector. Depending on the obtainable optical reflectivity as well as fabrication cost, any of these optical reflection mechanisms can be utilized. Note that a polarizing beam splitter is one form of optical reflection mechanisms available for optical manifolds, when the polarization switching scheme is utilized.

An optical delay of 10 ns is equivalent to about 300 cm long optical path length in free space. The optical path length in glass material with refractive index of 1.5 will result in about 200 cm for the same delay. Therefore the optical manifold using glass material should provide about 200 cm long optical path length. On the other hand, optical delay resolution of 1 ps is equivalent to about 0.2 mm optical path length in glass material. Accordingly the optical manifold needs to deliver 0.2 mm path length resolution and the discretely variable optical delay should provide a better than 16-bit precision.

Figure 8D:
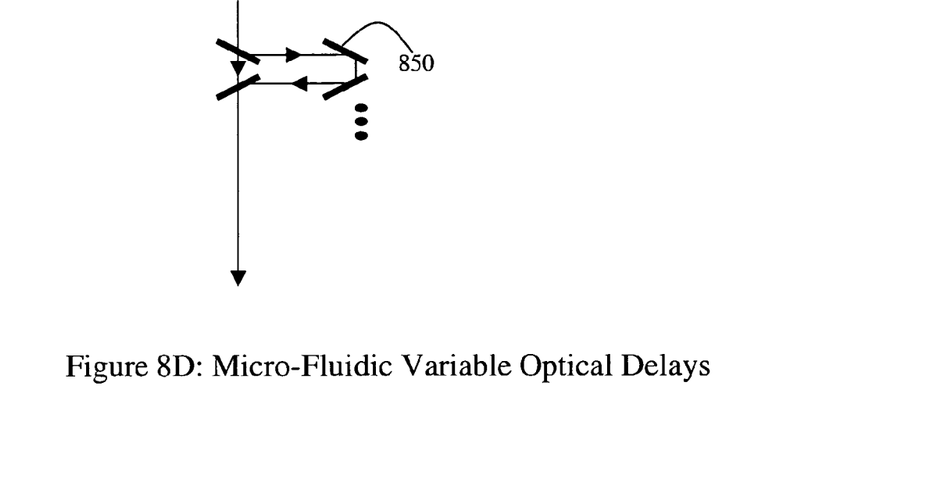
FIGS. 8D–E show optical manifolds according to the present invention utilizing micro-fluidic structures.
Figure 8E:
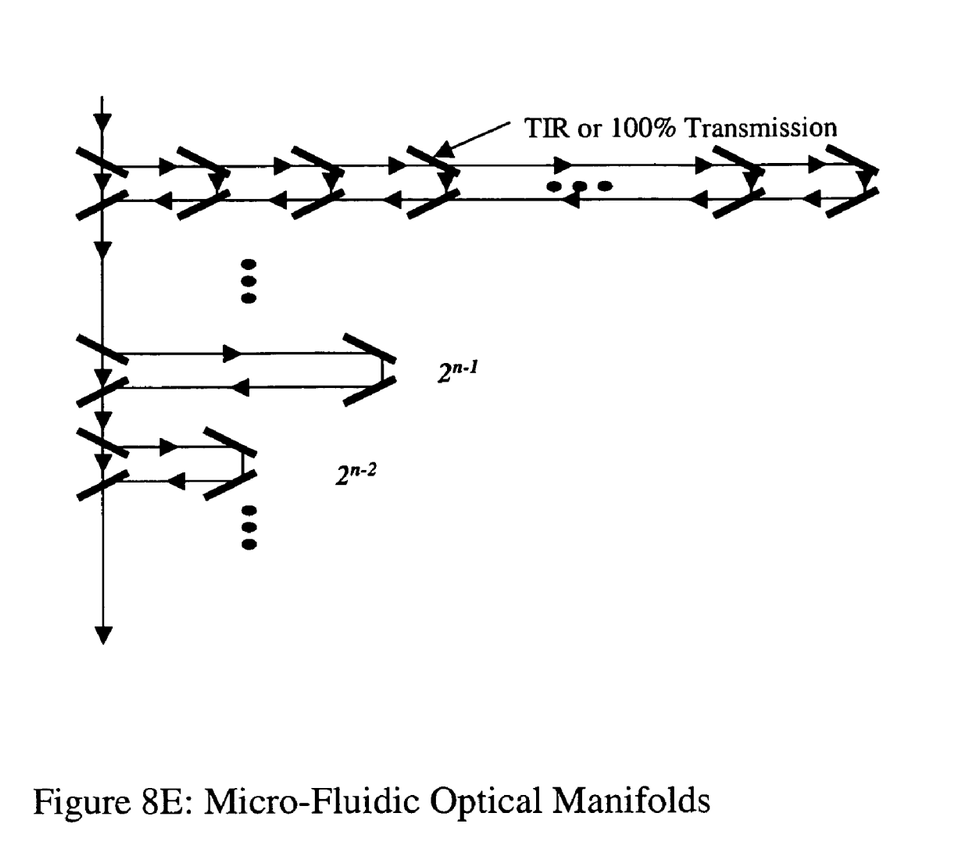

Referring to FIGS. 8D and 8E, the fluid varying principles described above with respect to index switching may be employed for an optical manifold. For example, microfluidic fluid switching mechanisms 850 at the positions of each polarizing beam splitter or TIR switch in FIGS. 8A–8C.

In these embodiments, regions intended to be filled with one of at least 2 possible fluids are used. When selected regions associated with the intended path are filled with a reflective fluid, the optical signal will follow a folded path corresponding with those selected regions. When regions are filled with transmissive fluid (e.g., air), the optical signal will pass through that region. Thus, for a full pass-through, the first and last (e.g., left-most as oriented in FIGS. 8D and 8E) remain or are injected with transmissive fluid.

Combined VOD Systems

Also described herein are embodiments of VOD systems for ultra wideband array antenna applications by combining the above-described optical manifolds and optical switching mechanisms. In preferred embodiments, such integrated systems are formed monolithically. Such a system can be provided that is compact, reliable, and low-cost, and further provided in a large array configuration, which can deliver wide delay range and high delay resolution simultaneously.

Figure 9:
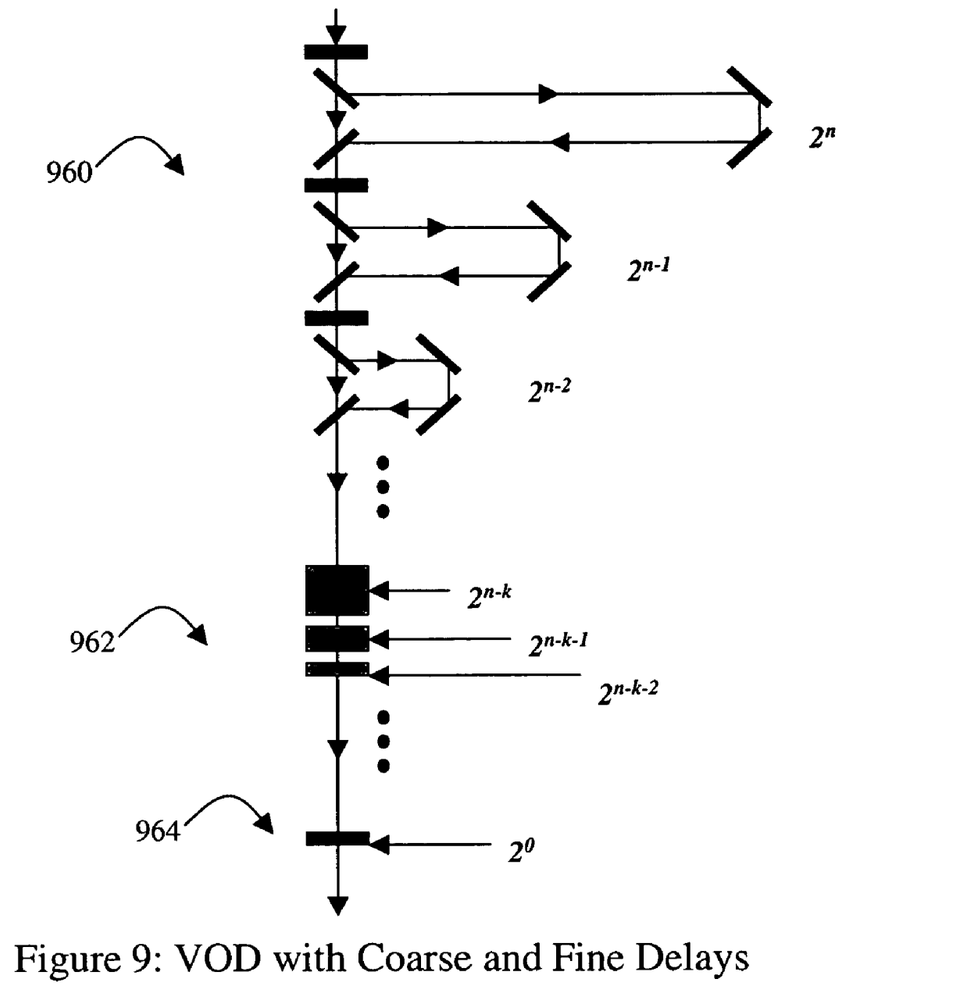
FIG. 9 shows an embodiment of the present invention integrating an optical manifold system, a micro-fluidic index switching system, and a liquid crystal delay system.

FIG. 9 shows a VOD with large, medium, and fine delays. Here, VODs with varying amount of delay range are serially interconnected together to deliver wide delay range and fine delay resolution. A TIR or polarization space switched d subsystem 960 provides "large" delay. A micro-fluidic index switched delay subsystem 962 provides "medium delay". A liquid crystal delay subsystem 964 provides "fine" delay.

The optical manifolds with folded paths in FIG. 9 can be designed with varying optical path lengths to produce a discretely variable optical delay.

Figure 10:
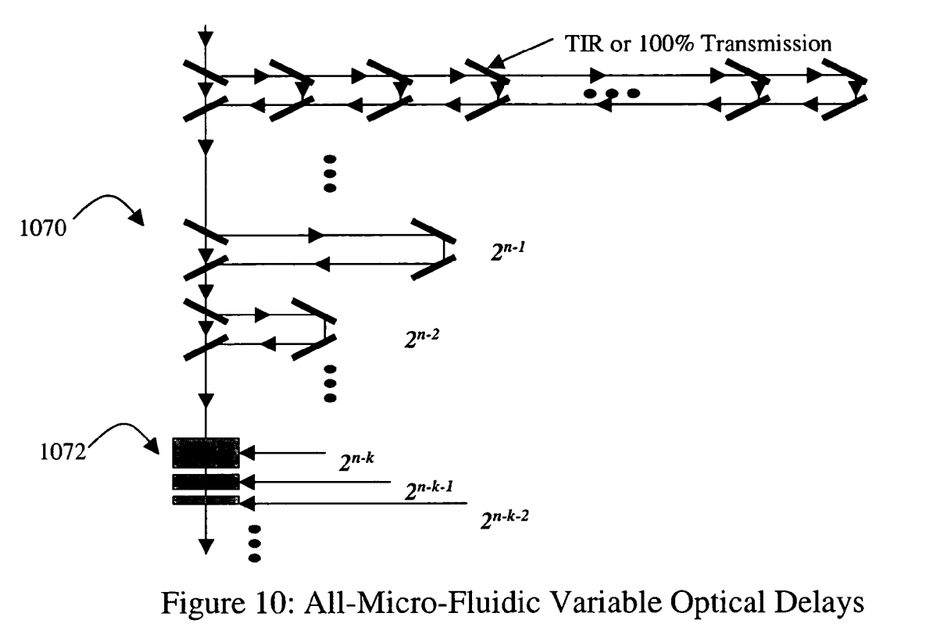
FIG. 10 shows an embodiment of the present invention integrating in a micro-fluidic system an optical manifold system and an index switching system.

FIG. 10 illustrates an all-micro-fluidic VOD using a TIR optical switching system 1070 and an index switching system 1072. The VOD with coarse and fine optical delay can be implemented by using micro-fluidic actuators only, which can simplify the device fabrication and assembly process.

Figure 11A:
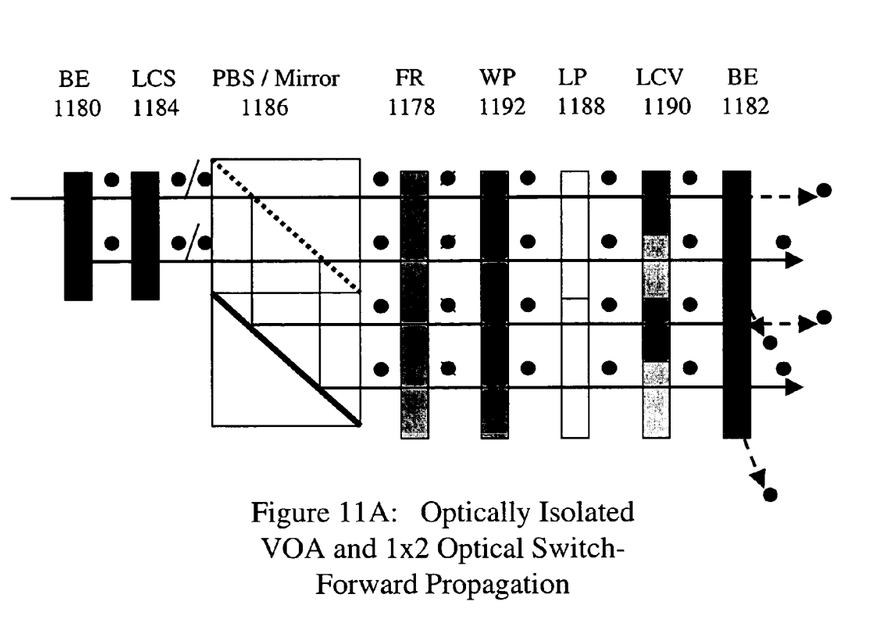
FIGS. 11A and 11B show an integrated optical isolator, variable optical attenuator, and optical switch of the present invention.
Figure 11B:
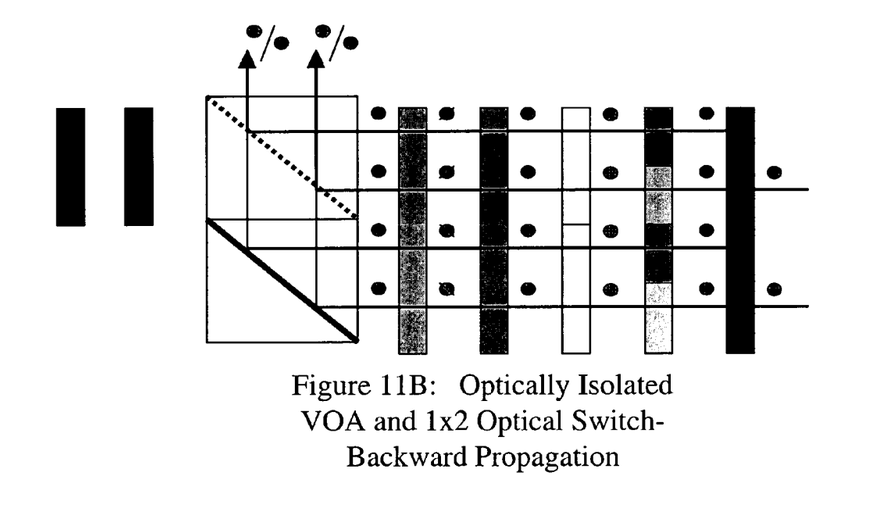

FIG. 11 shows the integration of optical isolator, variable optical attenuator, and optical switch into a single package by using liquid crystal elements, waveplates (WP), Faraday rotator (FR), linear polarizers (LP), birefringent elements (BE), polarization beam splitters, and corner reflectors. The combination of Faraday rotator 1178 and waveplate 1192 placed between input and output birefringence elements 1180 and 1182 can allow the optical signals to propagate in a forward direction only. The combination of switchable liquid crystal element (LCS) 1184 and polarization beam splitter 1186 provides an optical switching functionality. The combination of linear polarizer 1188 and variable liquid crystal element 1190 positioned between waveplate 1192 and birefringent element 1182 can also provide a variable optical attenuation. When a linearly polarized optical signal passes through a liquid crystal element, the state of polarization for the input signals can be changed into linearly polarized, circularly polarized, or elliptically polarized states depending on the amount of birefringence across the liquid crystal cell. Generally speaking, the output optical signals from the liquid crystal elements become elliptically polarized, unless a specifically controlled amount of birefringence for linear or circular polarization states are met when passing through the liquid crystal elements. The switchable liquid crystal elements (LCS) can generate linearly polarized output signals, while the variable liquid crystal elements (LCV) generate elliptically polarized output signals. It is also known that the elliptical state of polarization from the liquid crystal elements has prevented the integration of optical isolators with optical switches or VOA. FIG. 11 provides a unique and innovative device configuration to allow the integration of optical switches, optical isolator, and variable optical attenuator. Note that, by utilizing an independent LP/LCV combination for two optical paths, it is possible to introduce a variable amount of attenuation per polarization state such that polarization dependent loss (PDL) from other optical devices can be compensated.

The various VOA systems described herein can be utilized as a programmable weight for the delay-and-weight beamformer shown in FIG. 1. The expected attenuation range and resolution of VOA is about 20 dB and 0.2 dB respectively to be useful for the ultra wideband array antenna applications. The combined functionality of VOD and VOA provides complete analog optical processing capabilities to the beamforming processes.

Figure 12:
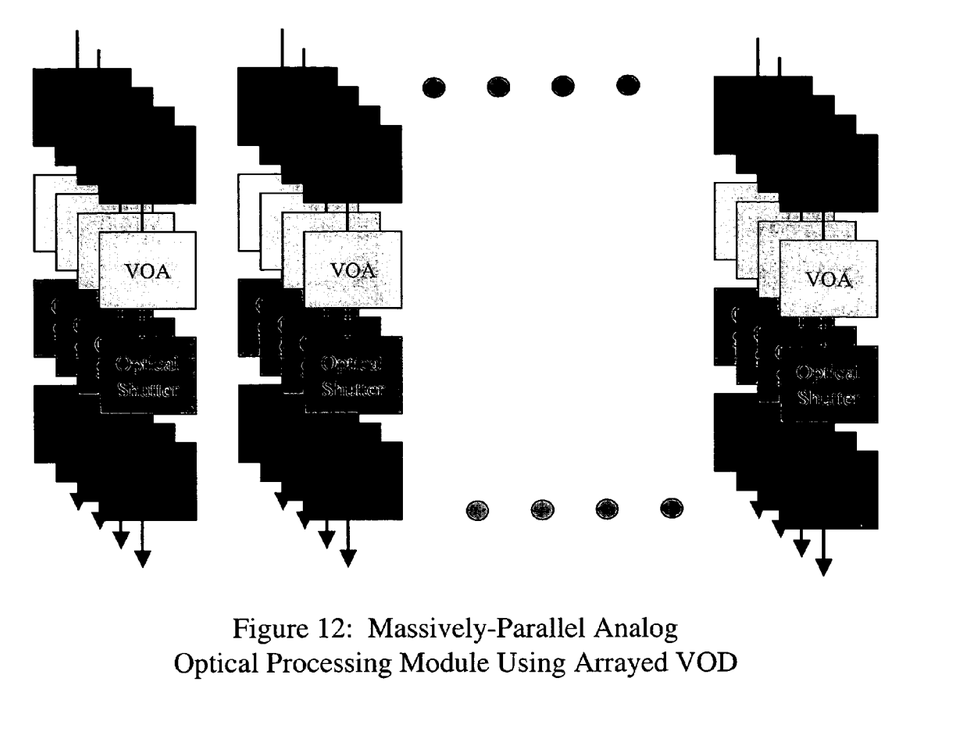
FIG. 12 shows a massively-parallel analog optical processing module using arrayed VODs.

The multifunctional analog optical processing module capable of delivering VOD, VOA, optical isolation, and optical shutter functionalities can be integrated in a massively parallel array configuration as shown in FIG. 12. The massively-parallel analog optical processing module can drastically reduce cost, size, and power consumption, while improving device density, reliability, and speed.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A variable optical delay system comprising a refractive index switching system wherein upon passage of an optical signal through the refractive index switching system, a delay is imparted by a fluid within a fluid-holding region, said fluid selected from the group consisting of air and one or more refractive liquids.

2. The variable optical delay system as in claim 1, wherein one or more fluid-holding regions capable of having at least two different fluids exchanged therein are provided.

3. The variable optical delay system as in claim 2, wherein the region dimensions are essentially constant.

4. The variable optical delay system as in claim 1, wherein the delay imparted is about 100 fs to about 10 ps.

5. The variable optical delay system as in claim 1, wherein an optical delay is imparted by introducing or evacuating the fluid within the fluid-holding region along the optical signal travel path.

6. The variable optical delay system as in claim 5, the fluid-holding region including one or more predefined gaps, wherein the introduction and/or evacuation of either air or liquid material is into said predefined gaps.

7. The variable optical delay system as in claim 6, further comprising one or more micro-pump, or micro-fluidic actuators for introducing and/or evacuating the fluid.

8. The variable optical delay system as in claim 7, wherein the micro-fluidic actuators are selected from the group consisting of electro-static actuators, electro-magnetic actuators, electro-thermal actuators, and MEMS actuators.

9. The variable optical delay system as in claim 1, wherein the refractive fluid comprises a chemically stable liquid compounds capable of providing a known refractive index value.

10. A variable optical delay system comprising optical manifolds including one or more index switching systems, the index switching system including:
one or more fluid holding regions capable of having at least 2 different fluids exchanged therein, said fluid selected from the group consisting of air and one or more refractive liquids,
wherein said one or more regions are positioned within a folded optical path to allow pass-through or delay depending on the choice of fluid in the region.

11. The variable optical delay system as in claim 10, wherein the folded path is extended by serial regions capable of having at least 2 different fluids exchanged therein.

12. The variable optical delay system as in claim 10, wherein a coarse delay is imparted on the optical signal.

13. The variable optical delay system as in claim 12, wherein the coarse delay is about 10 ps to about 1 ns.

14. The variable optical delay system as in claim 10, wherein multiple folds are provided.

15. The variable optical delay system as in claim 14, wherein multiple folds comprise single folds stacked on top of each other.

16. The variable optical delay system as in claim 14, wherein multiple folds comprise a single monolithic block of molded manifold.

17. A variable optical delay system including optical switching subsystem, an optical manifold subsystem; and a refractive index switching system, said a refractive index switching system comprising:
one or more fluid holding regions capable of having at least 2 different fluids exchanged therein, said fluid selected from the group consisting of air and one or more refractive liquids, wherein upon passage of an optical signal through the refractive index switching system, a delay is imparted by a fluid within the fluid-holding region.

18. The variable optical delay system as in claim 17, wherein the optical switching subsystem comprises a liquid crystal cell.

19. The variable optical delay system as in claim 17, wherein the optical manifold subsystem comprises a plurality of polarization switches having variable optical paths, wherein at least one optical route comprises a folded path.

20. The variable optical delay system as in claim 19, wherein the polarization switches comprise liquid crystal cells.

21. The variable optical delay system as in claim 17, wherein the optical manifold subsystem comprises a plurality of total internal reflection switches having variable optical paths, wherein at least one optical paths comprises a folded path.

22. The variable optical delay system as in claim 17, wherein the a refractive index switching system comprises at least one micro-fluidic actuator.

23. The variable optical delay system as in claim 22, wherein the a refractive index switching system comprises a first fluid region having a quantity of a first fluid with a first refractive index and a second fluid region having a quantity of the first fluid, further wherein the micro-fluidic actuator injects a second fluid with a second refractive index into the first fluid region or the second fluid region.

* * * * *